United States Patent
Tsao et al.

(10) Patent No.: US 6,654,232 B1
(45) Date of Patent: Nov. 25, 2003

(54) PORTABLE COMPUTER WHICH USES SPRING TO BUFFER SHOCK FORCE OF A MONITOR

(75) Inventors: Johnson Tsao, Taipei Hsien (TW); Hsin-Yuan Yang, Taipei Hsien (TW)

(73) Assignee: Inventec Appliances Corp., Taipei Hsien (TW)

(*) Notice: Subject to any disclaimer, the term of this patent is extended or adjusted under 35 U.S.C. 154(b) by 2 days.

(21) Appl. No.: 10/064,038

(22) Filed: Jun. 4, 2002

(51) Int. Cl.[7] .......................... G06F 1/16; G06F 1/1333
(52) U.S. Cl. .......................... 361/681; 361/683; 349/58
(58) Field of Search .............................. 361/681–683; 349/58, 60, 150, 158

(56) References Cited

U.S. PATENT DOCUMENTS 5,659,376 A * 8/1997 Uehara et al. ................. 349/58
5,675,397 A * 10/1997 Fukushima ................... 349/58
5,808,707 A * 9/1998 Niibori et al. ................. 349/58
6,181,555 B1 * 1/2001 Haley et al. ................ 361/681
6,229,695 B1 * 5/2001 Moon .......................... 349/58

* cited by examiner

*Primary Examiner*—Lisa Lea-Edmonds
(74) *Attorney, Agent, or Firm*—Winston Hsu

(57) ABSTRACT

A portable computer has a housing which has an opening formed on an upper side, and a monitor installed inside the housing at the opening. The monitor has a chassis, a liquid crystal display (LCD) panel fixed on the chassis for displaying images, and at least a spring. The spring has a first end connected to the chassis and a second end connected to the housing for elastically supporting the monitor inside the housing.

13 Claims, 4 Drawing Sheets

PORTABLE COMPUTER WHICH USES SPRING TO BUFFER SHOCK FORCE OF A MONITOR

BACKGROUND OF INVENTION

1. Field of the Invention

The present invention relates to a portable computer, and more specifically, to a portable computer that uses a spring to buffer shock force of a monitor.

2. Description of the Prior Art

In the past, consumers have used desktop computers to process documents. However, since the desktop computers are heavy and hard to transport, users cannot process documents when they go out. As technology develops day-by-day, there are many kinds of portable computers such as notebook computers and personal digital assistants (PDAs) being developed. These popular portable computers are easy to carry out so that users can process documents conveniently when they are going out. However, since users are always carrying out the portable computers, the portable computers are usually in an environment with a lot of vibration. It is possible that the portable computers may fall down due to the carelessness of users. Therefore, the portable computers are easily damaged, especially liquid crystal displays (LCDs) installed inside the portable computers. These LCDs are made of fragile material, and they cannot sustain great shock force. However, the LCDs make up an indispensable display interface of portable computers. Therefore, portable computers with buffers to absorb shock force are being developed by researchers.

Please refer to FIG. 1. FIG. 1 is a perspective view of a prior art portable computer 10. The portable computer 10 comprises a housing 12 and a monitor 20. The housing 12 has an opening 14 formed on an upper side of the housing 12. The monitor 20 is installed inside the housing 12 at the opening 14. The housing 12 further comprises a plurality of buttons 16 for allowing users to input signals into the portable computer 10.

Please refer to FIG. 2. FIG. 2 is an exploded diagram of the monitor 20 of the prior art portable computer 10. The monitor 20 comprises a printed circuit board (PCB) 22, a liquid crystal display (LCD) panel 24, a frame 26, a touch panel 28, and a protective film 30. The PCB 22 comprises circuits and a processor 18 for controlling operations of the portable computer 10. The LCD panel 24 is installed on the PCB 22 for displaying images. The frame 26 is installed around the PCB 22 and the LCD panel 24 for fixing the LCD panel 24 on the PCB 22. The touch panel 28 is installed on an upper side of the LCD panel 24 for receiving instructions inputted in a touch manner by users and transmitting the instructions to the processor 18 for further processing. The transparent protective film 30 is installed on the touch panel 28 for protecting the touch panel 28.

In order to avoid damage to the monitor 20 when the portable computer 10 receives a vibration or a shock force, the prior art monitor 20 further comprises a plurality of elastomers 32 installed on a bottom of the monitor 20. The elastomers 32 are made of elastic materials such as plastics or cushions. First sides 32a of the elastomers 32 are fixed on a bottom of the PCB 22, and second sides 32b of the elastomers 32 are fixed on an inner side of the housing 12 so as to elastically support the monitor 20 inside the housing 12 (please refer to FIG. 1). When the monitor 20 receives a shock force, the elastomers 32 can absorb a portion of the shock force so as to prevent the monitor 20 from receiving damage.

However, the elastomers 32 made of plastics or cushions can only absorb a little portion of shock force. Therefore, when the monitor 20 receives the shock force, a large portion of the shock force is still absorbed by the monitor 20, and only a little portion of the shock force is absorbed by the elastomers 32. Although a large thickness can make the elastomers 32 absorb more shock force, it will also increase the volume of the elastomers 32 which will in turn increase the volume of the portable computer 10. Moreover, the characteristics of the plastics and the cushions change under high temperatures and a high moisture environment, thereby further influencing the ability to absorb shock force. In addition, since the bottom of the PCB 22 has many circuits distributed on it, the elastomers 32 cannot be installed on the whole area of the bottom of the PCB 22, but can only be installed at appropriate positions in small pieces. However, this situation makes each position of the LCD panel 24 receive unequal force. Thus, the LCD panel 24 is more easily damaged. In different kinds of portable computers, the material, weight, and strength of the LCD panel 24 and PCB 22 are also different. Therefore, designers must choose the proper characteristics such as coefficient of elasticity of elastomers 32 to properly support the monitor. However, the characteristics of the elastomers 32 such as plastics or cushions must be changed through difficult manufacturing techniques. That is not convenient for producers. Therefore, the prior art buffer lacks flexibility, thereby increasing the cost of production.

SUMMARY OF INVENTION

It is therefore a primary objective of the claimed invention to provide a portable computer that uses a spring to buffer shock force of a monitor, so as to solve the problem of the prior art technology.

The claimed invention, briefly summarized, discloses a portable computer. The portable computer comprises a housing which has an opening formed on an upper side, and a monitor installed inside the housing at the opening. The monitor comprises a chassis, a liquid crystal display (LCD) panel fixed on the chassis for displaying images, and at least a spring. The spring has a first end connected to the chassis and a second end connected to the housing for elastically supporting the monitor inside the housing.

It is an advantage of the claimed invention that the claimed invention comprises at least a spring. The spring can absorb most of a shock force received by the monitor. Therefore the monitor is not easily damaged. Moreover, the characteristics of the spring are easily changed and the assembly of the spring is also easy and convenient.

These and other objectives of the claimed invention will no doubt become obvious to those of ordinary skill in the art after reading the following detailed description of the preferred embodiment which is illustrated in the various figures and drawings.

DETAILED DESCRIPTION

Figure 1:
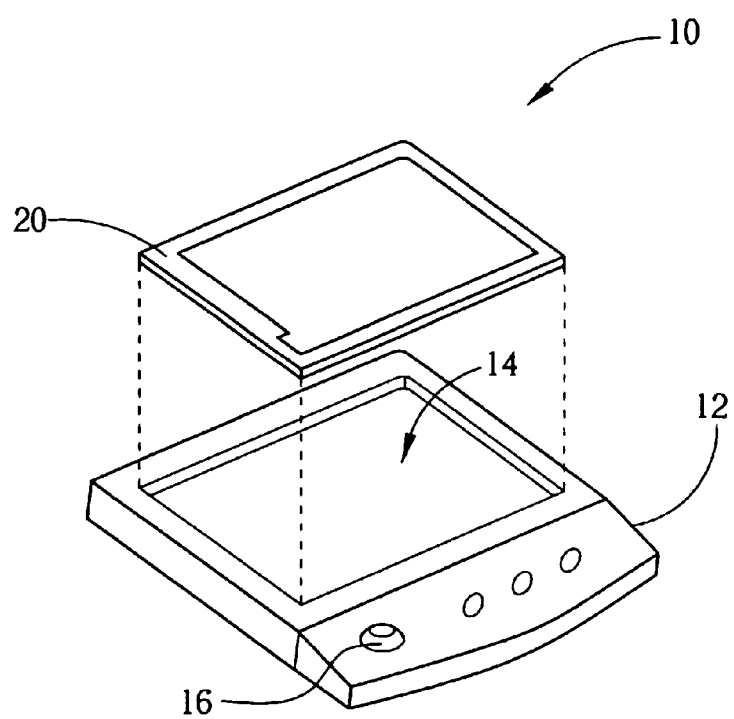
FIG. 1 is a perspective view of a prior art portable computer.
Figure 2:
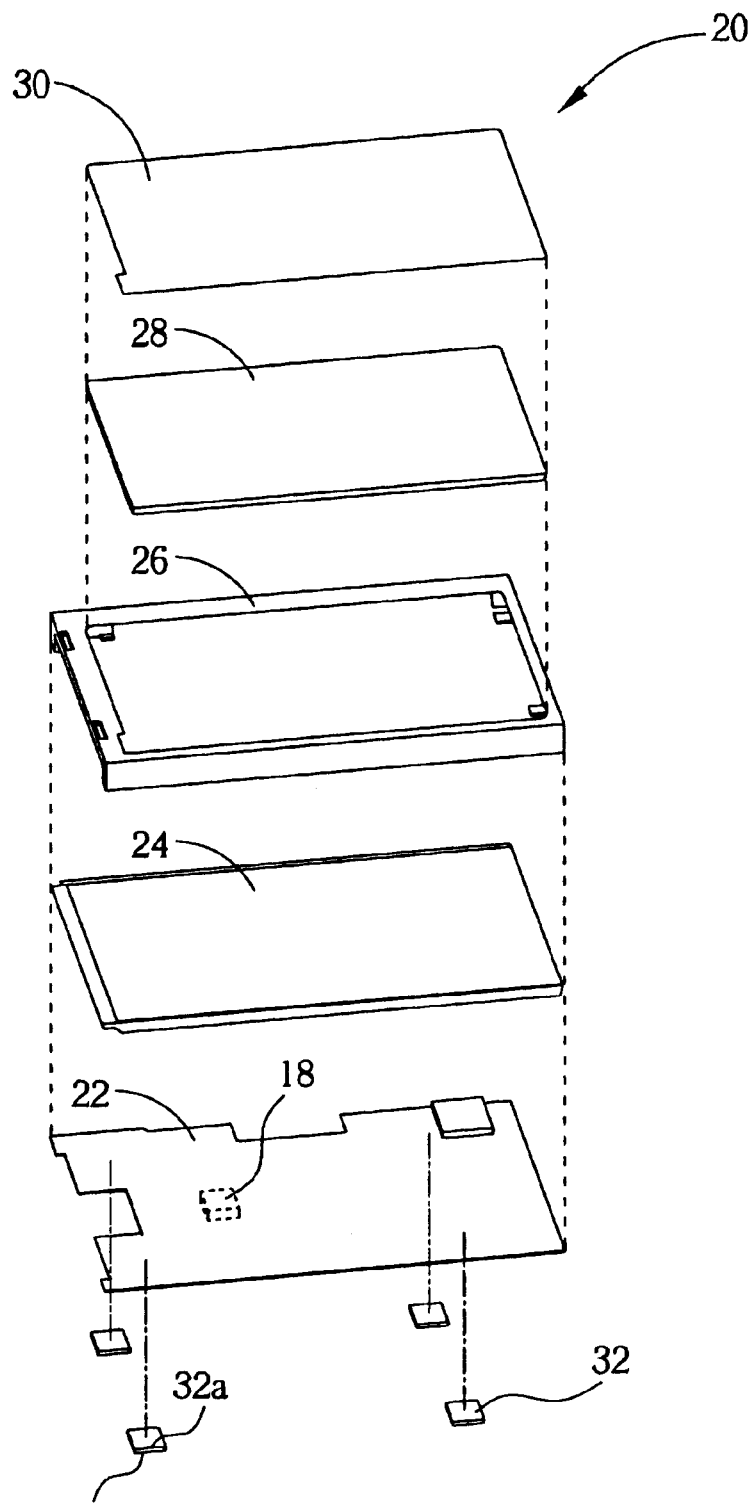
FIG. 2 is an exploded diagram of a monitor of the prior art portable computer.
Figure 3:
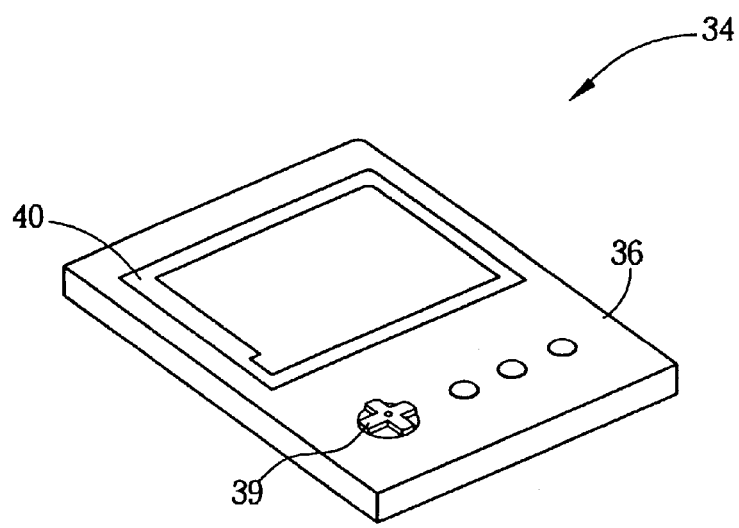
FIG. 3 is a perspective view of a present invention portable computer.

Please refer to FIG. 3. FIG. 3 is a perspective view of a present invention portable computer 34. The portable computer 34 comprises a housing 36 and a monitor 40. The housing 36 has an opening 38 formed on an upper side of the housing 36. The monitor 40 is installed inside the housing 36 at the opening 38. The housing 36 further comprises a plurality of input buttons 39 for allowing users to input signals into the portable computer 34.

Figure 4:
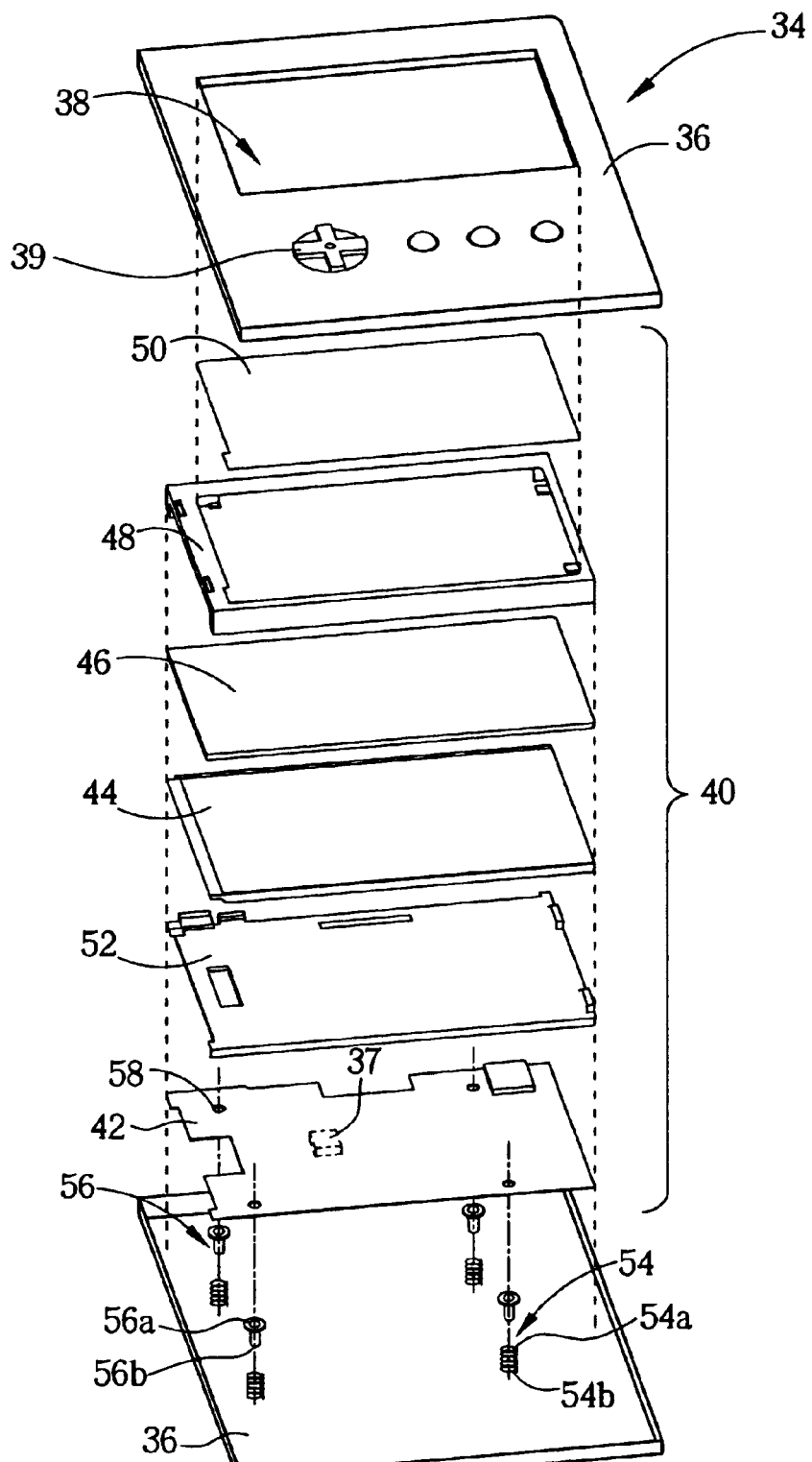
FIG. 4 is an exploded diagram of the present invention portable computer.

Please refer to FIG. 4. FIG. 4 is an exploded diagram of the present invention portable computer 34. A monitor 40 of the portable computer 34 comprises a PCB 42, a metal plate 52, an LCD panel 44, a touch panel 46, a frame 48, and a protective film 50. The PCB 42 comprises circuits and a processor 37 for controlling operations of the portable computer 34. The LCD panel 44 is used to display images. The touch panel 46 is installed on the LCD panel 44 for receiving instructions inputted in a touch manner by users and transmitting the instructions to the processor 37 for further processing. In order to increase the rigidity of the monitor 40, the monitor 40 further comprises the metal plate 52 installed between the PCB 42 and the LCD panel 44 so as to increase rigidity. The frame 48 is installed around the PCB 42, the metal plate 52, the LCD panel 44, and the touch panel 46 so as to fix the LCD panel 44, the touch panel 46, and the metal plate 52 on the PCB 42 and form a strong structure with the use of the metal plate 52. The transparent protective film 50 is installed on the touch panel 46 for protecting the touch panel 46.

In order to prevent the monitor 40 from receiving damage when the portable computer 34 receives a shock force or a vibration, a bottom of the monitor 40 further comprises four metal spiral springs 54 so as to buffer the shock force or the vibration. Each spiral spring 54 corresponds to a post 56. Each post 56 has a first end 56a for being inserted into a corresponding hole 58 on the PCB 42, and a second end 56b for being inserted into a first end 54a of the spiral spring 54 so as to fix the first end 54a of the spiral spring 54 on the bottom of the PCB 42. A second end 54b of the spiral spring 54 is fixed on an inner side of the housing 36 so that the spiral spring 54 can elastically support the monitor 40 inside the housing 36.

The metal spiral springs 54 are good shock absorbers. When the portable computer 34 receives a shock force or vibration, the spiral springs 54 can absorb most of the shock force received by the monitor 40 so that the monitor 40 is not easily damaged. In addition, since the monitor 40 further comprises the metal plate 52 installed between the PCB 42 and the LCD panel 44, the shock force transmitted from the spiral springs 54 is distributed evenly on the metal plate 52. Therefore, the monitor 40 is not easily damaged by an unbalanced force distribution.

The spiral springs 54 and posts 56 have small volume, and they only occupy a little space inside the housing 36 of the portable computer 34. In addition, the spiral springs 54 are installed on the bottom of the PCB 42 in an inserted manner. It is easy to change the positions of the spiral springs 54 by just inserting the spiral springs 54 into the corresponding holes 58 on the PCB 42. If designers want to change the shock absorbing ability of the monitor 40, designers only need to change to a different spiral spring 54 which has a different coefficient of elasticity. It is easy for producers to produce spiral springs with different characteristic by just changing the circle-number or the space between two successive circles of the spiral springs. The production technology of the spiral spring is mature at present, and producers can easily produce the different spiral springs in low cost. Moreover, the spiral springs 54 and posts 56 are made of productive metal material. The spiral springs 54 and posts 56 can electrically connect to the PCB 42 (such as electrically connect to a common ground of the PCB 42) so as to form an additional current path to the housing 36. Therefore, accumulative electric charges on the PCB 42 can discharge to the housing 36 through the spiral springs 54 and the posts 56, thereby increasing the electro-static discharge (ESD) ability of the portable computer 34. The spiral springs 54 are cheap and easy to produce. Thus, the production cost of the monitor can be reduced. Therefore, the spiral springs 54 can not only absorb the shock force efficiently, but also decrease costs and make the assembly of the monitor 40 more convenient and easy. Thus, the monitor 40 of the present invention portable computer 34 can solve the problem of the prior art technology.

The springs of the present embodiment mentioned above are the spiral springs 54. However, designers also can use other kinds of springs (such as flat metal springs) instead of the spiral spring 54. In addition, the touch panel 46 of the present embodiment is installed inside the frame 48 and surrounded by the frame 48. However, the touch panel 46 can also be installed outside the frame 48 and on the LCD panel 44. These and other variations also belong to the present invention technology.

In contrast to the monitor 20 of the prior art portable computer 10, the monitor 40 of the present invention portable computer 34 has at least a spring 54 installed between the monitor 40 and the housing 36. The spring 54 can elastically support the monitor 40 inside the housing 36. The monitor 40 also has a metal plate 52 to equally distribute the shock force received by the monitor 40. When the monitor 40 receives a shock force, the spring 54 can absorb most of the shock force so that the monitor 40 is not easily damaged. Moreover, the characteristics of the spring are easily changed and the assembly of the spring 54 is also easy and convenient. The spring 54 is also cheap. Therefore, the present invention portable computer 34 can be produced with low cost.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A portable computer comprising:
    a housing having an opening formed on an upper side; and
    a monitor installed inside the housing at the opening, the monitor comprising:
        a chassis;
        a liquid crystal display (LCD) panel fixed on the chassis for displaying images; and
        at least a spring having a first end connected to the chassis and a second end connected to the housing for elastically supporting the monitor inside the housing.

2. The portable computer of claim 1 wherein the monitor further comprises a frame installed around the chassis and the LCD panel for fixing the LCD panel on the chassis.

3. The portable computer of claim 1 wherein the chassis is a printed circuit board (PCB).

4. The portable computer of claim 3 wherein the PCB further comprises a processor for controlling operations of the portable computer.

5. The portable computer of claim 3 wherein the spring is a conductive metal spring and is electrically connected to the PCB.

6. The portable computer of claim 1 wherein the chassis is a metal plate for increasing rigidity of the monitor.

7. The portable computer of claim 1 wherein the monitor further comprises a touch panel for receiving instructions inputted in a touch manner by users.

8. The portable computer of claim 7 wherein the monitor further comprises a protective film installed on an upper side of the touch panel for protecting the touch panel.

9. The portable computer of claim 1 wherein the chassis of the monitor further comprises at least a connector for connecting the first end of the spring to the chassis.

10. The portable computer of claim 9 wherein the spring is a spiral spring and the connector is a post, and the post has a first end for being inserted into a corresponding hole on the chassis and a second end for being inserted into the first end of the spiral spring so as to fix the first end of the spiral spring to the chassis.

11. The portable computer of claim 1 wherein the housing further comprises at least an input button for inputting a signal into the portable computer.

12. The portable computer of claim 1 being a personal digital assistant (PDA).

13. The portable computer of claim 1 wherein the first end of the spring is fixed on a backside of the chassis and the second end of the spring is fixed on an inner side of the housing.

* * * * *